June 17, 1930.  F. N. BIERCE  1,764,286
REVERSE STOP FOR AUTOMOBILES
Filed May 10, 1927  2 Sheets-Sheet 1
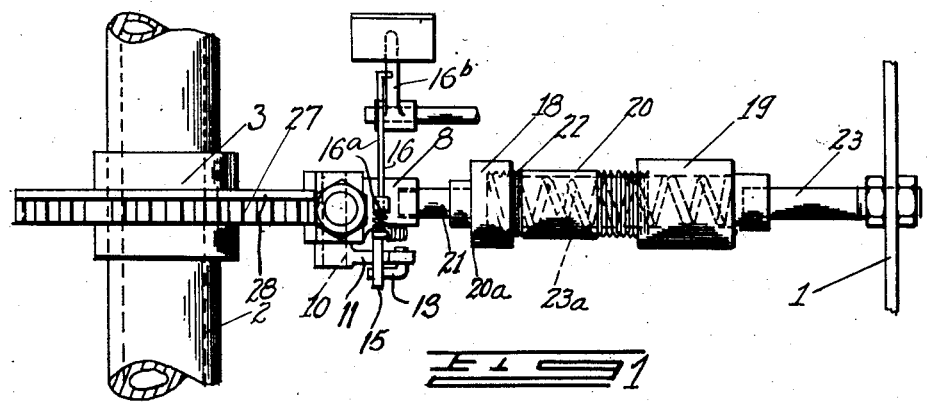
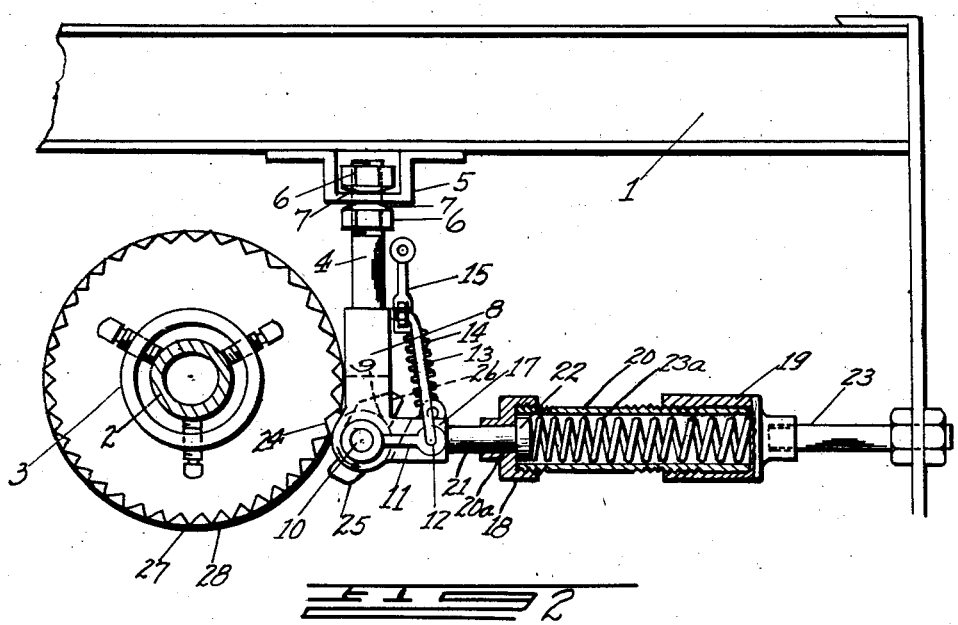
Inventor
Fred N. Bierce
By
Allen & Allen
Attorney June 17, 1930.  F. N. BIERCE  1,764,286
REVERSE STOP FOR AUTOMOBILES
Filed May 10, 1927  2 Sheets-Sheet 2
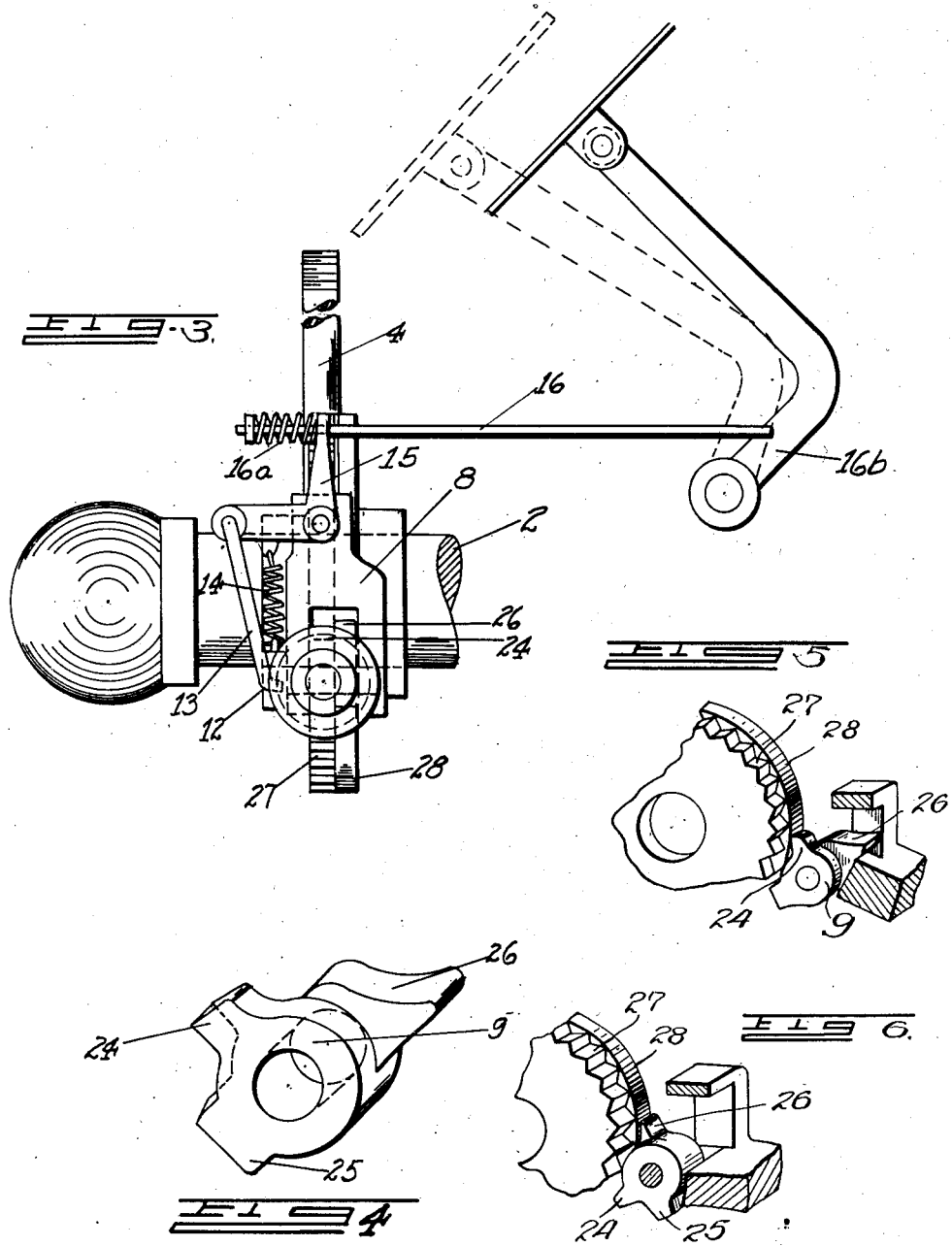
INVENTOR.
Fred N. Bierce
BY
ATTORNEY.

Patented June 17, 1930

1,764,286

UNITED STATES PATENT OFFICE

FRED N. BIERCE, OF CINCINNATI, OHIO

REVERSE STOP FOR AUTOMOBILES

Application filed May 10, 1927. Serial No. 190,310.

My invention relates to reverse stops for automobiles.

In the art, there has been some development in the provision of means which will prevent an automobile from backing down hill when the clutch is out and the driver of the car has his foot on the accelerator, and is awaiting an opportunity to again move up the hill.

With the congestion that is experienced in driving in traffic, particularly in hilly cities, there is constant danger if the driver is not watching his driving very carefully, that when the car stops on a hill, the car will back up and a rear end collision will be the result. There have been several modifications which will prevent this temporary backing, but to the best of my knowledge and belief, the back locking devices have had one serious objection which is that they cannot be instantly inhibited to permit the driver to back when he needs to, to avoid collision with some other car which is not equipped with such a safety device.

It is the object of my invention to provide a reverse stop for an automobile which may be readily set in operative position during ordinary driving and prevent unexpected backing of the car, but which can, when occasion requires, be very quickly inhibited, so that the operator is protected only so far as he inadvertently allows his car to back up, and he does not find himself in a helpless position where he wants to back to avoid a collision and cannot do it because of the safety stop.

The above and an exceedingly convenient arrangement which can either be coupled with the drive shaft, or connected as an operative part of the transmission, I accomplish by that certain arrangement and combination of parts of which I have shown a preferred illustration.

In the drawings:—

Figure 1 is a top plan view of the assembly.

Figure 2 is a diagrammatic end elevation of the arrangement shown in Figure 1.

Figure 3 is a diagrammatic side elevation showing the preferred arrangement of parts shown in Figures 1 and 2.

Figure 4 is a perspective view of the preferred shape and arrangement of the parts in the pawl and cam casting, which I employ.

Figure 5 is a fragmentary view of the pawl during regular forward driving of the vehicle.

Figure 6 is a fragmentary perspective view of the cam showing its position when the operator backs the vehicle against the holding power of the pawl and causes the release of the device due to the compression of the spring.

Generally indicated at 1 I have shown the vehicle frame. The drive shaft, in combination with which I have shown my novel reverse stop, is indicated at 2. On the drive shaft I preferably mount a toothed hub 3 which is preferably cast in sections which are then bolted on the drive shaft.

I have secured a supporting rod 4 in a bracket 5 which is preferably attached to a lateral brace of the chassis body. In order to provide a support which will allow the supporting rod or bar to pivot slightly, I may use nuts 6 with rounded heads 7 which will allow the bar to be secured tightly to the bracket, but which may, notwithstanding, give with movement of the unattached end of the bar. Connected to the bar 4 is the yoke member 8 which carries the tripping and blocking pawl boss 9. The pawl boss is mounted on a rod 10 which has a crank arm 11 with an eyelet 12 through which is secured a connecting rod 13. A spring 14 of light construction is also shown, which assists in returning the pawl to its normal position without too severe a jerk. The connecting rod is attached to one of the arms of a bell crank lever 15 which has a rod 16 tensioned by a spring 16$^a$ connected to the other of its arms. The rod 16 is connected to the clutch pedal lever 16$^b$ of the car, and the spring 16$^a$ allows sufficient lost motion to be taken up that normal depressing of the clutch does not bring the reverse stopping mechanism into operative position.

The yoke has an extended portion 17 which is connected to a spring tensioning device. The device consists of two threaded caps 18 and 19, secured on a casing 20. The cap 18 has a hole 20ª therein, through which a rod 21 extended from a piston 22 is slidably movable. The rod 21 is connected to the extension 17. The other cap 19 has a rod 23 connected therewith, which is mounted in or on the vehicle frame as indicated in Figures 1 and 2. A spring 23ª is tensioned within the casing which tends to spring the piston 22 to its full extremity.

The cam, which is of particular importance to the successful operation of the device, will now be described in detail. Referring to Figure 4, the cam or pawl is preferably made from an integral casting, and it has a pawl tooth portion 24, a stop 25, and a cam bearing portion 26. The portion 26 is offset from the plane of the pawl and stop portions. The toothed wheel, which is indicated at 3, has a toothed periphery 27 and a circular shroud 28, and the position of the pawl and cam is such that the pawl is in the plane of the toothed portion of the hub, and the cam is in the plane of the cylindrical shroud.

The operation of the device is as follows:—During normal driving, the clutch pedal is elevated and the pawl is entirely disengaged from contact with the toothed portion of the hub. When the clutch pedal is depressed a moderate amount, as heretofore explained, the spring 16ª takes up the lost motion. The pawl 24 is shown in Figure 2 as it would appear with the clutch pedal completely depressed. The limit of movement of the pawl is determined by the stop 25 which bears against the yoke 8, and prevents the pawl being disengaged except with compression of the spring 23ª. If it were not for the stop 25 during reverse movement of the vehicle, the pawl might be rotated clear around so that it would be moved to inoperative position. If it is desired to prevent backing of the car, the clutch pedal is depressed to its limit when the pawl is moved into engagement with the toothed wheel as indicated in Figure 2. If the driver wishes to back the car at a time when the pawl is engaged with the toothed wheel, he throws his engine into reverse and lets his clutch in.

Applying power through the transmission for backing up the machine causes the pawl boss with the cam and pawl to rotate until the cam 26 comes in contact with the shroud 28, at which time the pawl 24 will be forced out of engagement with the toothed hub. It is understood that the spring tension device will be set so as to inhibit the backing up of the car when disconnected from the engine. However, the application of power from the engine will produce the above described condition when the operator desires to back the machine. The slightest reverse rotation of the drive shaft will cause the pawl boss and cam to rotate in a clockwise direction by virtue of the spring tension and place the inhibiting device in normal position for forward movement of the car.

From the above description it will be understood that the device is what might be termed fool-proof. During ordinary driving, the release of the clutch by a downward push on the clutch pedal does not have any effect on the reverse blocking mechanism. A harder push on the clutch pedal will set the reversing stop in operation. The control of the reversing stop is thus intimately connected with mechanism which the operator of the car is normally using at the time when he may see fit to inhibit the stop.

Having thus described my invention what I claim as new and desire to secure by Letters Patent is:—

1. In combination with a motor vehicle having an element through which power is transmitted from the motor to the driving wheels, and a foot controlled member the movement of which is essential to the operation of the vehicle, a stop tending to prevent reversing of said element comprising a toothed wheel carried by said element, and a pawl to engage said toothed wheel, said pawl having a support, interconnecting means between said pawl and said foot controlled member, and a resilient support for said pawl support whereby said pawl may be inhibited.

2. In combination with a motor vehicle having an element through which power is transmitted from the motor to the driving wheels, and a foot controlled member the movement of which is essential to the operation of the vehicle, a stop tending to prevent reversing of said element comprising a toothed wheel carried by said element, and a pawl to engage said toothed wheel, said pawl having a support, interconnecting means between said pawl and said foot controlled member, and a resilient support for said pawl support whereby said pawl may be inhibited, and the interconnecting means between said pawl and said foot controlled member being such that unusual depressing of said foot controlled member will set said reverse stop.

3. In a motor vehicle, a stop tending to prevent reversing movement comprising in combination with a driving member, a member mounted on said first mentioned member comprising a toothed periphery and a shroud, a pawl, a blocking member and a cam formed in an integral part, a support for said part, having a resilient mounting, a connection with said part and the clutch pedal of the vehicle, said connection being such that when said pedal is abnormally depressed, said pawl will be moved to engaging position.

4. In a motor vehicle, a stop tending to prevent reversing movement comprising in combination with a driving member, a member mounted on said first mentioned member comprising a toothed periphery and a shroud, a pawl, a blocking member and a cam formed in an integral part, a support for said part, having a resilient mounting, a connection with said part and the clutch pedal of the vehicle, said connection being such that when said pedal is abnormally depressed, said pawl will be moved to engaging position, and the cam resilient mounting being so arranged with relation to said pawl that reversing movement of the vehicle under motive power will actuate the cam and inhibit the pawl.

5. In a motor vehicle, a stop tending to prevent reversing movement comprising in combination with a driving member, a member mounted on said first mentioned member comprising a toothed periphery and a shroud, a pawl, a blocking member and a cam formed in an integral part, a support for said part, having a resilient mounting, a connection with said part and the clutch pedal of the vehicle, said connection being such that when said pedal is abnormally depressed, said pawl will be moved to engaging position, and the blocking member being so arranged with relation to said pawl, that said blocking member will abut said support prior to the disengagement of said pawl.

6. In a motor vehicle, a stopping mechanism comprising means to prevent the reverse movement of the vehicle, and means operatively connected with the clutch pedal of said vehicle for moving the reverse preventing means into operative position, said operative connection being such that unusual depression of said clutch pedal will set said stopping mechanism.

FRED N. BIERCE.